United States Patent [19]

Meyer

[11] Patent Number: 4,684,149

[45] Date of Patent: Aug. 4, 1987

[54] COLLAPSIBLE WHEELCHAIR AND WHEELCHAIR STRUCTURE

[75] Inventor: Bruno Meyer, Wohlen, Switzerland

[73] Assignee: Valutec AG, Dottikon, Switzerland

[21] Appl. No.: 736,439

[22] Filed: May 21, 1985

[30] Foreign Application Priority Data

May 21, 1984 [CH] Switzerland ........................ 2494/84

[51] Int. Cl.[4] ............................................ B62M 1/14

[52] U.S. Cl. ........................... 280/650; 280/242 WC; 280/657; 297/42

[58] Field of Search ............... 280/242 WC, 289 WC, 280/42, 649, 650, 657; 297/42, 45; 52/109, 645, 646; 403/247, 252, 257

[56] References Cited

U.S. PATENT DOCUMENTS

| | | | |
|---|---|---|---|
| 1,732,872 | 10/1929 | Wittliff | 403/247 |
| 2,982,379 | 5/1961 | Fisher | 52/645 |
| 4,067,249 | 1/1978 | Deucher | 297/330 |
| 4,076,304 | 2/1978 | Deucher | 297/330 |
| 4,320,818 | 3/1982 | Knoche | 280/242 WC |
| 4,553,770 | 11/1985 | Lyman | 280/289 WC |

*Primary Examiner*—John J. Love

*Assistant Examiner*—Eric D. Culbreth

*Attorney, Agent, or Firm*—Frishauf, Holtz, Goodman & Woodward

[57] ABSTRACT

To reduce the weight of the collapsible wheelchair, and the depth of the wheelchair, when collapsed, only three spreader braces (25,49,51) are used to connect, respectively, the back and side frame elements, (45,47) of the collapsible wheelchair together, the remaining interconnection being formed by tension cables (53;57′,57″,59″), which tend to counteract the spreading effect of the collapsible spreader braces, and are located, with respect to the spreader braces, in triangular position, one (53) of the tensioning cable extending parallel to two spreader braces (49,51) located in triangular configuration with respect to the frame elements (45,47), and other tensioning cables extending diagonally, in pairs (57,59) between the frame elements (45,47), located at the rear portion of the chair to hold the rear portion towards each other when the weight (24) of the user tends to pull together the forward portions (**45*d*,47*d*) of the frame elements (45,47). The spreader braces are preferably formed with over-center toggle, or knee joints and lockable in position by a safety connecting sleeve (61**).

24 Claims, 7 Drawing Figures

COLLAPSIBLE WHEELCHAIR AND WHEELCHAIR STRUCTURE

Reference to related patents, the disclosures of which are hereby incorporated by reference: U.S. Pat. No. 4,076,304, issued Feb. 28, 1978, Deucher; U.S. Pat. No. 4,067,249, and U.S. patent application Ser. No. 718,079, filed Apr. 1, 1985.

The present invention relates to an invalid chair structure and more particularly to a collapsible or foldable wheelchair and wheelchair structure which has two parallel side frames which, in use, are held apart by suitable spreader elements but can be collapsed or folded close together for storage, placement in an automobile behind the driver seat, or the like.

BACKGROUND

Various other types of folding wheelchairs are known and one typical raising-type wheelchair, in which the upwardly raising movement of the patient is assisted by mechanism in the wheelchair itself is described in referenced U.S. Pat. No. 4,076,304. Two essentially parallel side frames have wheels attached thereto. In use, four or more foldable spreader braces hold the side frames spread apart, with a seat of flexible material therebetween. The seat may be made of fabric, leather, or the like. For storage, transport, for example in an automobile, or the like, the spreader braces can be folded or unlocked in order to move the side frames of the chair next to each other. Levers and rods are used to fold the various spreader braces together or, respectively, to lock them in extended position.

The structure works well; it does, however, have a disadvantage in that the multiplicity of spreader braces, levers and rods and the like increases the overall weight of the raising chair. Additionally, it is very difficult for an invalid to fold the wheelchair together using only his own efforts or strength; such folding, however, is frequently desirable in order to fit the wheelchair in the usual space behind the driver seat of an automobile. The relative folded space of a wheelchair makes it difficult to fit such a wheelchair in an ordinary autombile so that, frequently, special seating arrangements or requirements for placement of the wheelchair behind the driver seat may have to be met.

When erected, the wheelchair is stiff. If the wheelchair is to be used over surfaces which are not essentially flat, for example over unpaved surfaces, for sporting events or even on poorly maintained sidewalks, the substantial stiffness of the operating frame may interfere with proper engagement of all the wheels of the wheelchair with the ground surface. The chair, then, will have a tendency to be slightly tippy, which, particularly to an invalid, may be disconcerting.

THE INVENTION

It is an object to provide a wheelchair structure and more particularly a raisingtype wheelchair which is of low weight, can be folded to only a narrow depth, preferably foldable by the user her/himself with one hand, and which, additionally has a certain amount of "give" so that all wheels will remain in contact with the ground although the ground surface may be uneven.

Briefly, two side frame elements are used, as customary, connected by two collapsible spreader braces. In accordance with the invention, additional spreader braces connecting the side frames are eliminated, however, and replaced by at least one tension cable, preferably two pairs of tension cables extending diagonally across the side frame, tensioning the spreader braces when in locked, extended condition, and providing for two cross-parallelogram coupled arrangements. The parallelograms are divided in half, diagonally, so that two sides of the parallelogram are formed, respectively, by the stiff, usually tubular structure elements of the side frames, and the diagonal by the respective cable. Due to the dual-triangular construction, the connection is stable, yet permits slight twising thereof if the wheelchair operates over uneven ground. The back, preferably, is cross-connected by an additional brace.

Preferably, the cables are so positioned that the tension is applied to the side frame elements tending to hold together the rear portion of the side frame elements. When the weight of a user on the seat tends to collapse the forward braces towards each other, the cables hold the rear portion of the frame elements in aligned position so that they cannot pivot towards each other about fulcrum points defined by the attachments of the extended braces. The triangle-arrangement of the cables and side frames or brace structures, respectively, thus counters forwardly applied forces due to the weight of the user, tending to spread the back portions apart, and thereby hold the chair in its essentially defined design postion without, however, contributing excessively to the weight.

In accordance with a preferred feature of the invention, the cables are made of stranded, or braided stainless steel.

The spreader braces are, preferably, formed with the knee joints which have a slight over-center, or toggle and a locking element so that, once the braces are extended, they will snap into extended position, being held in extended position by the cables, and additionally locked and secured against possible inadvertent collapse.

The arrangement has the advantage that for the seat element only two cross braces are needed, so that, with another cross brace for the back, only three collapsible cross braces are required; the cross braces can be easily released from extended position by the one-hand operation of the user, the cables contributing substantially to decrease of the overall weight. The small number of spreader braces—two for the seat and one for the back, and the absence of additional cross braces and connecting levers not only substantially reduces the weight of the wheelchair, but also simplifies its construction and hence provides for a wheelchair which can be made much more cheaply than heretofore. The elimination of additional spreader braces, levers and connecting rods also reduces the folded width since less space is required than heretofore.

The reduction in the number of stiff cross braces has the additional and unexpected advantage that the stiffness of the overall vehicle frame is reduced so that the wheelchair can readily operate over uneven surfaces without a tendency of anyone of the wheels to lose ground contact. Due to the substantial elasticity of the connecting elements between the two side frames, minor differences in level of the ground surfaces are accepted by slight twist or deflection of the frame elements. The relative movement between the side frames is limited, however. Since the overall structure or chassis can twist slightly, all four wheels of the wheelchair will retain surface or ground contact, so that the wheelchair can be used for "wheelchair olympics" on meadow or grass surfaces, for example.

DRAWINGS

Figure 3D:
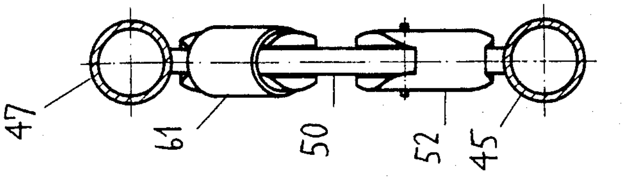
Figure 3C:
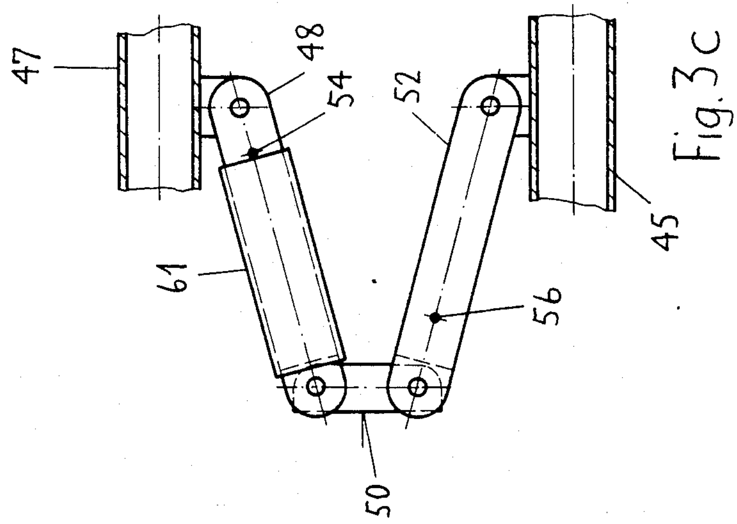
Figure 3B:
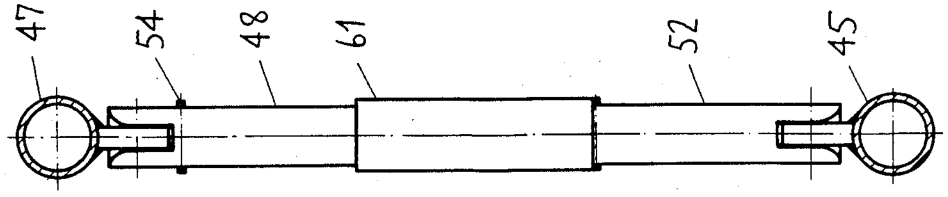
Figure 3A:
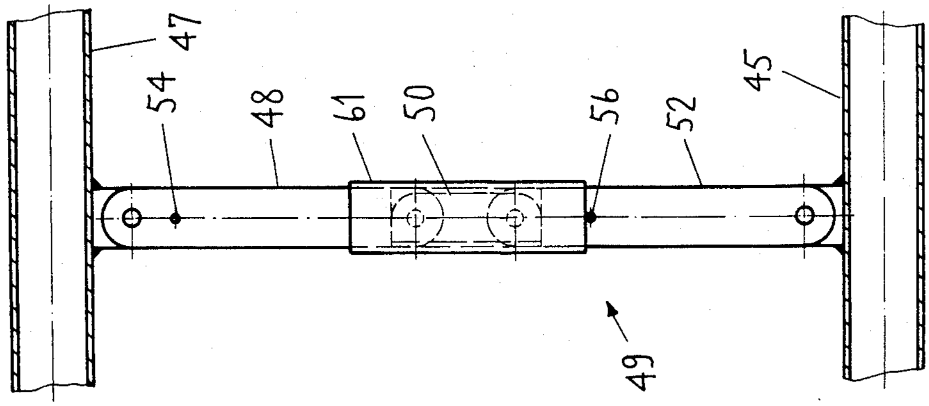

FIG. 3*a* is a top view of a cross brace in extended, locked condition;

FIG. 3*b* is a side view of the cross brace in extended position;

FIG. 3*c* is a side view of the brace of FIG. 3*a* just prior to being completely collapsed or folded;

FIG. 3*d* is a side view of the brace of FIG. 3*c*; and

Figure 4:
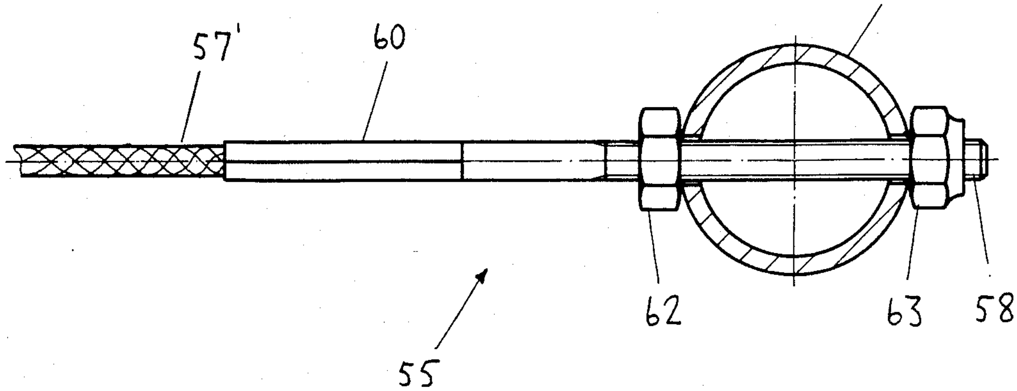

FIG. 4 is a part sectional illustration of attachment of a tensioning table to a tublar element of the side frame.

DETAILED DESCRIPTION

The invention will be described in connection with a raising-type wheelchair illustrated, schematically in FIG. 1. The raising-type wheelchair has a chassis or frame 11 with front wheels 13 and rear wheels 14. The forward portion of the chassis has a pivot point 15, to which is seat 17 (FIGS. 1,2) is pivotably attached. Likewise, a height-adjustable brace 19 is pivotably attached to the forward portion of the chassis at 15. Seat 17 is biased upwardly by a spring 16 linked to the seat 17 and to a bar 11*a* on the frame, in order to permit the user of the wheelchair to rise while applying only relatively small forces to the support 19 in order to change from seated position to raised or standing position. A foot support 21 is connected to the seat 17. A back 23 is pivotally connected to the seat 17, the back 23 being maintained essentially in vertical position, regardless of the position of the seat 17 by a mechanism—not shown in FIG. 1, and which is well-known and may, for example, be as described in the referenced patent U.S. Pat. No. 4,076,304. The position of the back 23 thus ensures that its alignment with respect to the ground surface will be essentially the same, regardless of position of the seat 17 to assist the user in rising. Bar 11*a* is pivotally connected at one end by pivot 11*b* to frame 11, and at the other end is pivotally coupled by a connecting link 11*c* to the back 23.

The chair can be folded flat. The frame structure is held apart by two cross braces and a further cross brace is provided for the back. Thus, for the overall construction, only three cross braces are needed. Only one of the cross braces 25 is visible in FIG. 1, which, for collapse, must be deactivated, or collapsed, that is, changed from the position shown in FIG. 3*a*, FIG. 3*b* to those of FIG. 3*c*, 3*d*. For collapse of the chair it is only necessary to release a locking sleeve 61 which fits over a knee joint and then to pull the respective cross braces in the direction of the arrows 27, 29,31 (FIG. 1). Reference numerals 33,35,37 schematically illustrate the respective planes in which the respective brace 25 across the back, 51 across the back portion of the side frame elements, and 49 across the bottom portion of the side frame elements—see FIG. 2—will be folded.

Figure 1:
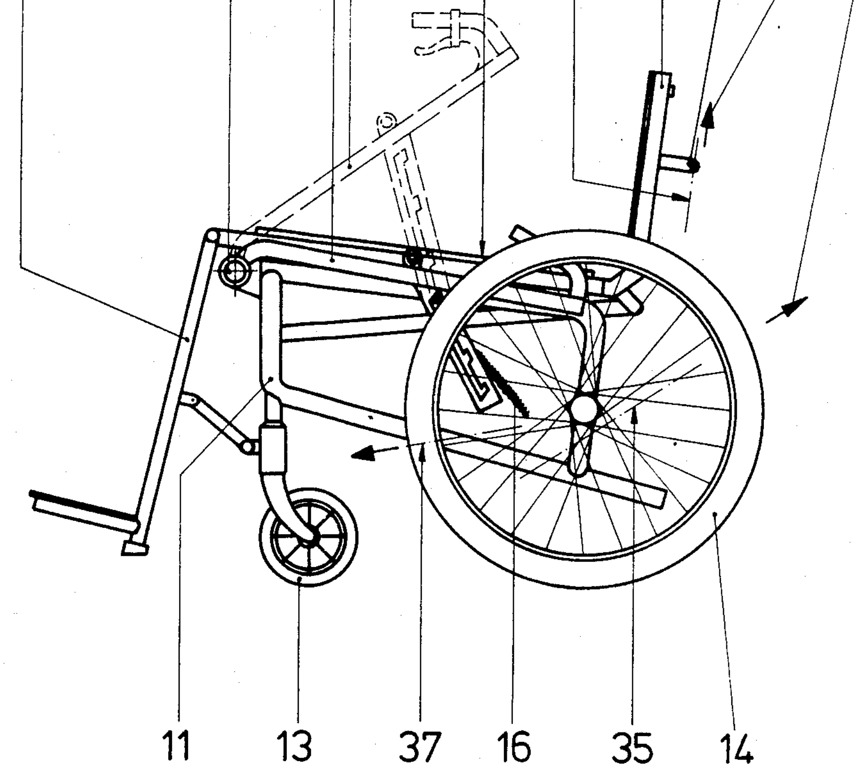
FIG. 1 is a schematic side view of a raising-type folding wheelchair incorporating the present invention, and for which all elements and structure units not necessary for an understanding of the present invention have been omitted, or shown only in highly schematic form.
Figure 2:
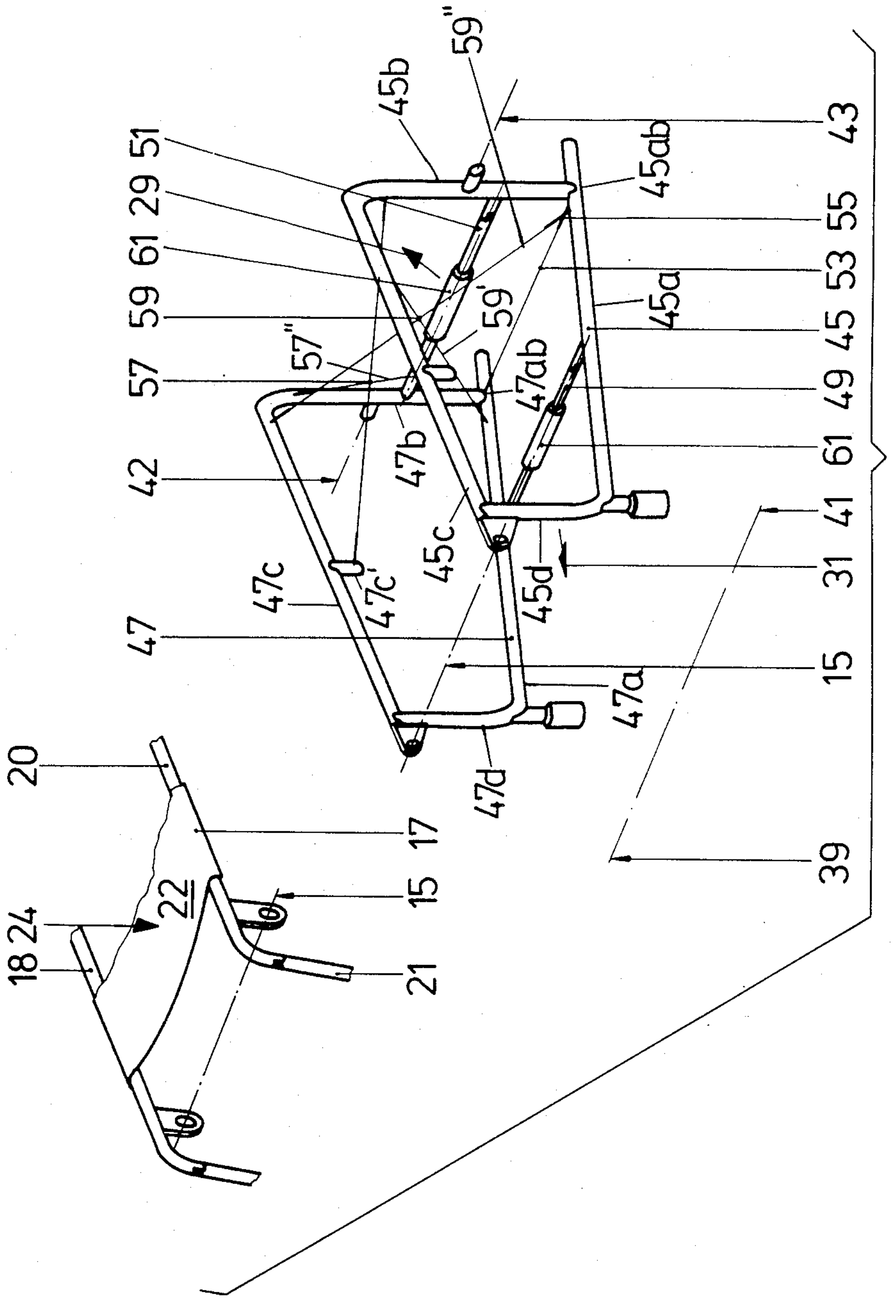
FIG. 2 is a perspective, exploded view of the side frames, showing the cabling arrangement, with the seat removed.

FIG. 2 illustrates the chassis arrangement of the raising chair in greater detail. The position of the front wheel axles is shown by the chain dotted lines 39 and 41; the position of the axles of the rear wheels 14 is shown by the chain dotted lines 42 and 43. The frame 11 has two side frame elements 45,47 which are connected by two cross braces 49,51. The cross brace 49 connects the lower portion of the side frames 45,47; the cross brace 51 connects the rear portion of the side frames 45,47. The side frames are essentially rectangular, or trapezoidal, or parallelogram shaped—in side view—and, when connected to the wheels for operation over a horizontal surface, will have essentially the position shown in FIG. 1. Bars 11*a* have been omitted from FIG. 2 for clarity.

The side frame elements 45,47 are maintained apart, horizontally, by the cross braces 49,51, when the cross braces are in their extended position. A tensioning cable 53 extends essentially parallel to the cross braces 49,51. The tensioning cable preferably is made of stranded or braided stainless steel. The length of cable is adjustable by an adjustment shown in detail in FIG. 4, which illustrates an end portion-and-adjsutment arrangement for the cable. Other materials can be used for the cable, for example nylon. The cable shown in FIG. 4 as cable 57' is secured to a sleeve 60 which, in turn, is attached to a threaded bolt 58. Bolt 58 passes through an opening in the side frame 45. The side frame 45, typically, is tubular, the bolt passing through both walls, and being secured in position by two nuts 62,63. Tightening of the nut 63 and retightening of the counter nut 62 permits tightening or tensioning the cable 57'. Similar arrangements can be used with all the cables.

In addition to cable 53, two further pairs of diagonally extending cables 57,59, formed by individual cables 57',57" and 59',59" are used. The planes of the diagonals intersect. The pair 57 is located in a generally horizontally extending plane; the pair 59 is located in an essentially vertically extending plane. The cable pair 57 connects the upper portion of the side frames 45,47; the pair 59 connects the rear portion of the side frames.

The cross braces 25,49,51 are placed under compression by the cables 53,57',57",59',59". The tension cables thus have the tendency to exert compressive forces on the cross braces 49,51. The cross braces are formed with an intermediate knee joint which, upon being subject to such compressive forces, tends to remain in stretched or extended position. When the dead or over-center position of the knee joint is passed, the knee joint will remain stretched due to the tension applied by the cables. For safety, a sleeve 61 is provided which can be slipped over the knee joint to lock the knee joint in extended position. The sleeve can be freely slideable on one of the cross brace elements, e.g., cross brace element 48 (FIG. 3*a*–3*d*), with a sliding path limited by stops 54,56. FIG. 3, collectively, illustrates the construction and operation of any one of the cross braces, in the example selected the cross brace 49. Cross brace 49 has the brace parts 48,50,52 linked together by pivot joints, and connected at their ends to suitable pivots 48*a*, 52*a* on the side frame elements 45,47. The locking sleeve 61 can be placed in the position shown in FIGS. 3*a*,3*b* for locking the brace in extended position or slid to the position shown in FIGS. 3*c*,3*d* when it is intended to collapse the chair.

FIG. 1, as noted above, has a pivot 15 to which the seat 17 is pivotally connected. The pivot joint is also illustrated in FIG. 2, in which the seat 17 is shown exploded, or removed from the side frame elements 45,47. The seat 17 itself has two side frame units 18,20, across which a fabric or leather seat strap 22 extends.

USE AND OPERATION

Let it be assumed that the seat is extended. The weight of the user is schematically illustrated by the force arrow 24 (FIG. 2) acting on the seat 17. This will result in forces which have the tendency to move the side frame elements 45,47 together in the forward or front region since they are maintained apart by the cross braces 49,51 at the rear. The movement of the side frame elements 45,47 towards each other in the front region, however, is limited since the tension cables 53,57′,57″,59′,59″ in combination with the cross braces 49,51 prevents such approach of the forward portions of the side frame elements 45,47. The chassis, however, will not be stiff but is capable of some twist, or springiness and thus can overcome uneven surface conditions of support, thereby retaining all four wheels 13,14 of the wheelchair in ground contact.

If the user wishes to move, for example, from the seat 17 to the seat of a vehicle, the user need only release the locking sleeve 61 from the respective three cross braces 24,49,51 and then pull the three cross braces in the direction of the arrows 27,29,31 (FIG. 1). The chair then can be collapsed, that is, the two side frames, 45,47 can be placed close and parallel to each other. Since the chair is light—only three cross braces being needed for the entire chair—and two only for the side frame, and the structural components being readily made of lightweight metal, the chair can be lifted and slid behind a driver or passenger seat of an automotive vehicle.

To erect the chair, again, the chair is rolled out from the vehicle—single-hand operation permits extending one cross brace after another, counter the direction of the arrows 27,29,31, and then locking the cross braces in position by sliding the locking sleeve 61 from the position shown in FIGS. 3*c*,3*d* to that shown in FIGS. 3*a*,3*b*.

One of the tension cables, typically tension cable 53, extends practically parallel to the direction of the two cross braces, and spaced from the cross braces themselves. As shown in FIG. 2, the tension cable 53 is located adjacent to or at the corner 45*ab*, from which side frame parts 45*a*,45*b* extend and to which, in turn, cross braces 49,51, respectively, are connected. In other words, one could consider the attachment points of the cross braces 49,51 and of the tension cable 53 to be located at the corners of an imaginary or theoreticaly triangle. The distances between the respective attachment points on the respective side frames can be so selected or dimensioned that the desired stability with, however, elasticity and capability of twist of the overall chassis is obtained. An arrangement which essentially that of the relative position as shown in FIG. 2 is suitable. The tensioning cables, when suitably arranged to cooperate with the cross braces, have the tendency to apply compressive force to the cross braces. This is of particular importance in cross braces which have a toggle, or over-center or knee joint, as shown in detail in FIG. 3*a*–3*d*. *The joint is then prestressed, which has the tendency to hold the knee jont in stretched position. The elasticity and "give" of the tension cable permits snapping the cross braces from collapsed into extended position. The additional sleeve 61 provides a handle, and lock in order to ensure maintenance of the joint in extended position. Due to the tensioning, frictional forces are applied on the locking sleeve 61 which, then, additionally, will reliably retain the cross braces in tension condition. If necessary, a spring snap lock, or ball-and-detent arrangement can be used to additionally and reliably ensure maintenance of the sleeve 61 in the desired position.*

In accordance with a preferred feature of the invention, at least one pair of diagonally located tensioning cable is additionally provided, such as the pair 57′,57″ and/or the pair 59′,59″. The additional triangular cables increase the stability of the chassis construction. The planes of the diagonals in which the pairs 57′,57″ and 59′, 59″ are located may, preferably, extend essentially horizontally and vertically, respectively. In accordance with a particularly preferred embodiment of the invention, two such diagonal cable pairs are used, in which the planes of the respective pairs intersect approximately at right angle. A frame having the cable pairs 57,59 and the tension cable 53 has excellent stability while permitting slight twists to accept an uneven running surface with full maintenance of ground contact of the wheels.

Various modifications and changes may be made; for example, the cross braces can be constructed in the form of a scissor-construction with only a single joint, rather than the double joint shown in FIG. 3*c*, FIG. 3*d*. The arrangement as shown in FIG. 3—collectively—is, however, preferred since two joints, with double pivots as shown can be easily operated with one hand which is of particular advantage if the raising chair is to be erected by the user her/himself and should be folded by the user alone, for example in connection with a trip in a vehicle.

One of the pairs of diagonally located tensioning cables should, preferably, be placed in a plane which is essentially horizontal, and connect the side frame elements 45,47 at an upper region thereof. This is particularly desirable when the arrangement includes the cross brace 49, as illustrated located about halfway along the length of the lower part 45*a* and the single tensioning cable 53 connecting the rear corner 45*ab*. The diagonal cable pair 57 may be attached to small depending stubs 47*c′*, depending from the upper part 47*c* of the cross brace, to permit some sag of the seat strap 22 when the weight of the user is applied without excessive interference between the respective cables and the seat strap 22.

The vertically arranged pair 59 of cables, preferably also used, is located in an essentially vertical plane which connects the rear frame at parts 45*b*,47*b* and counteracts the forces which are due to the weight of the user when applied to the seat strap 22, as illustrated schematically by the arrow 24, and which, then, counteracts a tendency of the forward frame portions 45*d*,47*d* to approach each other.

Various other changes and modifications may be made within the scope of the invention concept.

I claim:

1. Collapsible mobile wheelchair structure, comprising a support frame or chassis (11) including two substantially rigid side frame elements (45, 47) each having two support wheels coupled thereto;

collapsible spreader braces (24, 49, 51) movably connected to said side frame elements and, when in a straight condition, maintaining the side frame elements at a predetermined distance from each other to define a use condition, while permitting, upon collapse of the spreader braces, folding of the side frame elements towards and close to each other, said collapsible spreader braces including means for permitting a limited amount of twisting movement of said side frame elements relative to each other substantially in the planes of said side frame elements when said collapsible spreader braces are in said straight condition to define said use condition, and said collapsible spreader braces (24, 49, 51) including brace elements (48, 52) and a collapsing joint (50, 61) connecting and attaching said brace elements together, said collapsing joint maintaining said brace elements, selectively, in essentially aligned position, while permitting collapsing of the brace elements towards each other;

a collapsible seat (22) secured to each of the side frame elements; and at least one tension cable means (53; 57', 57'', 59, 59'') connecting the side frame elements (45, 47) together, said at least one tension cable means comprising at least one pair (57, 59) of flexible elongated tension cables each being diagonally connected between opposite side frame elements (45, 57) to apply compressive forces to said spreader braces when said spreader braces are in said straight condition, said tension cable means permitting said twisting movement of one of said side frame elements relative to the other side frame element even when said support wheels are on an uneven support surface, thereby providing solid support on an uneven support surface.

2. Collapsible wheelchair structure according to claim 1, wherein the side frame elements (45, 47) each have a bottom frame part or portion and a rear upwardly extending part or portion (**45*b*) extending at an essentially right angle from the bottom frame part, said bottom frame part and rear upwardly extending frame part being connected at a junction (45*ab***);

only two spreader braces (49, 51) are provided, connected to the respective bottom part (**45*a*) and the rear upwardly extending part; (45*b***);

and wherein at least one connecitng cable (53) is provided connected at one end at least approximately to the junction (**45*ab*) of one of the side frame elements and at another end to one of said parts or portions remote from the junction point of the other of the side frame elements to connect the respective side frame elements (45, 47**) at positions forming a triangle.

3. Collapsible wheelchair structure according to claim 2, wherein the side frame elements (45, 47) have forward portions (**45*d*, 47*d*) extending essentially parallel to the rear upwardly extending parts or portions (45*b***), said upwardly extending parts or portions forming back portions;

the seat (22) is located between the forward and the back portions;

and the at least one tension cable pair (59) applies tension to the side frame elements intending to counteract a force (24) applied by the weight of the user vertically downwardly on the seat and tending to narrow the forward portions and hence spread the back portions (**45*b*) by maintaining the back portions in relative position with respect to each other, as determined essentially by the spreader braces (49, 51**).

4. Collapsible wheelchair structure according to claim 1, wherein at least one connecting cable (53) is provided extending essentially parallel to the direction of two spreader braces (49, 51) when the spreader braces are in extended position.

5. Collapsible wheelchair structure according to claim 1, wherein the plane of the diagonal of the tension cable pair is essentially horizontal.

6. Collapsible wheelchair structure according to claim 1, wherein the plane of the diagonal of the tension cable pair is essentially vertical.

7. Collapsible wheelchair structure according to claim 1, wherein two pairs of diagonally extending tension cables (57,59) are provided, located in intersecting planes.

8. Collapsible wheelchair structure according to claim 7, wherein one of the pair (57) of the tension cables is located in a plane which is essentially horizontal;

the side frame elements have upper (**47*c*) and lower (45*a***) parts;

and said one of the diagonal pair of tension cables which is located in an essentially horizontal plane connects the upper parts of the side frame elements (45,47).

9. Collapsible wheelchair structure according to claim 7, wherein the side frame elements have essentially vertically extending rear parts (**45*b***);

and wherein one of the pairs of tension cables (59) is located in an essentially vertical plane, and connects the rear parts of the frame elements.

10. Collapsible wheelchair structure according to claim 1, wherein the side frame elements have upper and lower parts (**45*c*, 45*a*, 47*c*, 47*a***);

and one (49) of the spreader braces is located essentially centrally of the lower parts (**45*a*, 47*a***) of the respective side frame elements and connects the side frame elements.

11. Collapsible wheelchair structure according to claim 1, wherein the side frame elements have forward (**45*b*) and rear (45*d***) parts;

and wherein one (51) of the spreader braces is located essentially centrally of the rear parts, connecting the rear parts.

12. Collapsible wheelchair structure according to claim 10, wherein the side frame elements have forward (**45*b*) and rear (45*d***) parts;

and wherein one of the spreader braces is located essentially centrally of the rear parts, connecting the rear parts;

wherein said spreader braces connecting the lower parts (**45*a*) and the rear parts (45*b***) are the only braces connecting the side frame elements;

the lower parts (**45*a*) and the rear parts (45*b***) are connected together to define a junction;

and the at least one tension cable means (53) tensions said junctions (**45*ab*) of the two side frame elements (45,47**) towards each other.

13. Collapsible wheelchair structure according to claim 1, further including a back portion (23) and including spread-apart back elements (23) when the wheelchair is in use condition;

and wherein one of the collapsible spreader braces (25) connects said spread-apart back elements for, selectively, maintaining said elements in spaced, condition.

14. Collapsible wheelchair structure according to claim 1, wherein the collapsible spreader braces (25,49,51) are foldable, include over-center or toggle or knee joints, and locking means (61) to lock the joints in extended position.

15. Collapsible wheelchair structure according to claim 14, wherein the locking elements include a slidable locking sleeve (61), slidable over the joint of the spreader braces to hold the spreader braces in extended position and bridging the joint.

16. Collapsible wheelchair structure according to claim 1, further including length adjustment means (58,60,62,63) coupled to the respective at least one tension cable for adjusting the length of the respective tension cable (53,57′,57″,59′,59″).

17. Collapsible wheelchair structure comprising a support frame or chassis including two substantially rigid side frame elements (45, 47), each having two support wheels coupled thereto;

collapsible spreader braces (25, 49, 51) movably connected to said side frame elements and, when in a straight condition, maintaining the side frame elements at a predetermined distance from each other to define a use condition while permitting, upon collapse of the spreader braces, collapsing of the side frame elements towards and close to each other, said collapsible spreader braces including means for permitting a limited amount of twisting movement of said side frame elements relative to each other substantially in the planes of said side frame elements when said collapsible spreader braces are in said straight condition to define said use condition, and said collapsible spreader braces (25, 49, 51) including brace elements (48, 52) and a collapsing joint (50, 61) connecting and attaching said brace elements together, said collapsible joint maintaining said brace elements, selectively, in essentially aligned position, while permitting collapsing of the brace elements towards each other;

a collapsible seat (22) secured to each of the side frame elements, the two side frame elements having forward parts (**45*d*, 47*d*), rear parts (45*b*, 47*b*), upper parts (45*c*, 47*c*) and lower parts (45*a*, 47*a***);

said support wheels (13, 14) being coupled to the respective side frame elements at the forward part (**45*d*) and rear part (45*b***), respectively;

a back (23) coupled to the seat (22) and including spaced back frame elements when the wheelchair is in use condition; and at least one tension cable means (53; 57′, 57″, 59′, 59″) connecting the side frame elements (45, 47) together; and wherein said at least one tension cable means comprises at least one pair (57, 59) of flexible, elongated tension cables, each being diagonally connected between opposite side frame elements (45, 57) to apply compressive forces to said spreader braces when said spreader braces are in said straight condition, said tension cable means permitting said twisting movement of one of said side frame elements relative to the other frame element even when said support wheels are on an uneven support surface, thereby providing solid support on an uneven support surface.

18. Collapsible wheelchair structure according to claim 17, wherein only three spreader braces (24, 49, 51) are provided, one (49) of the spreader braces connecting the lower parts of the side frame elements essentially centrally of the length thereof;

a second one (51) of the spreader braces connecting the rear parts (**45*b*) of the side frame elements upwardly of a junction (45*ab*) of a respective rear part with a respective lower part (45*a***);

a third spreader brace (25) connecting the back frame elements;

and wherein the at least one tension cable pair applies tensioning force tending to pull the rear parts (**45*b*, 47*b***) toward each other.

19. Collapsible wheelchair structure according to claim 18, wherein the at least one cable pair includes tensioning cables (57′) tending to pull the side frame elements (45,47) towards each other in the region of the rear parts (**45*b***) of the side frame elements.

20. Collapsible wheelchair structure according to claim 7, wherein the at least one tension cable pair comprises at least one pair of diagonally located tensioning cables (57′,57″;59′,59″) connected to the rear part (**45*b***) of the side frame element.

21. Collapsible wheelchair structure according to claim 17, wherein the at least one tension cable pair is secured to a junction (**45*ab*) of a lower essentially horizontal part (45*a*) and a rear essentially upwardly directed (45*d*) part of the respective side frame elements (45) and interconnects the respective side frame elements for tensioning the side frame elements counter the spreading effect of the spreader braces (25,49,51**).

22. Collapsible wheelchair structure according to claim 20, wherein at least one connecting tension cable (53) is provided extending essentially parallel to the spreading direction of at least two of the spreader braces (49,51).

23. Collapsible wheelchair structure comprising a support frame or chassis (11) including two substantially rigid side frame elements (45, 47), each having two support wheels coupled thereto;

collapsible spreader braces (25, 49, 51) movably connected to said side frame elements and, when in a straight condition, maintaining the side frame elements at a predetermined distance from each other to define a use condition while permitting, upon collapse of the spreader braces, collapsing of the side frame elements towards and close to each other, said collapsible spreader braces including means for permitting a limited amount of twisting movement of said side frame elements relative to each other substantially in the planes of said side frame elements when said collapsible spreader braces are in said straight condition to define said use condition, and said collapsible spreader braces (25, 49, 51) including brace elements (48, 52) and a collapsing joint (50, 61) connecting and attaching said brace elements together, said collapsing joint maintaining said brace elements, selectively, in essentially aligned position, while permitting collapsing of the brace elements towards each other;

a collapsible seat (22) secured to each of the side frame elements; and at least one tension cable means (53; 57′, 57″, 59′, 59″) connecting the side frame elements (45, 47) together;

and wherein the side frame elements have upper and lower parts (**45*c*, 45*a*, 47*c*, 47*a***);

one (49) of the spreader braces is located essentially centrally of the lower parts (**45*a*, 47*a*) of the respective side frame elements and connects the side frame elements; and wherein the side frame elements further have forward (45*b*) and rear (45*d***) parts;

and a further one (51) of the spreader braces is located essentially centrally of the rear parts, connecting the rear parts said tension cable means applying compressive forces to said spreader braces when said spreader braces are in said straight condition, permitting said twising movement of one of said side frame elements relative to the other frame element even when said support wheels are on an uneven support surface, thereby providing solid support on an uneven support surface.

24. Collapsible wheelchair structure according to claim 23, further including a back portion (23) and including spread-apart back elements when said wheelchair is in use condition;

and wherein said spreader braces include a back brace element (25) connecting said spread-apart back elements for, selectively, maintaining said back elements in spaced or collapsed condition.

* * * * *